United States Patent
Kelkar et al.

(10) Patent No.: US 8,589,554 B2
(45) Date of Patent: Nov. 19, 2013

(54) INTELLIGENT AND ELASTIC RESOURCE POOLS FOR HETEROGENEOUS DATACENTER ENVIRONMENTS

(75) Inventors: Suhas A. Kelkar, Pune (IN); Karanbir Gujral, Pune (IN); Monish Darda, Pune (IN)

(73) Assignee: BMC Software, Inc., Houston, TX (US)

( * ) Notice: Subject to any disclaimer, the term of this patent is extended or adjusted under 35 U.S.C. 154(b) by 382 days.

(21) Appl. No.: 12/893,301

(22) Filed: Sep. 29, 2010

(65) Prior Publication Data

US 2011/0213886 A1 Sep. 1, 2011

Related U.S. Application Data

(60) Provisional application No. 61/291,106, filed on Dec. 30, 2009.

(51) Int. Cl.
*G06F 15/173* (2006.01)
*G06F 15/16* (2006.01)

(52) U.S. Cl.
USPC .......................................... 709/226; 709/229

(58) Field of Classification Search
None
See application file for complete search history.

(56) References Cited

U.S. PATENT DOCUMENTS

| | | | |
|---|---|---|---|
| 2004/0010592 A1* | 1/2004 | Carver et al. | 709/226 |
| 2004/0267897 A1* | 12/2004 | Hill et al. | 709/217 |
| 2005/0188089 A1* | 8/2005 | Lichtenstein et al. | 709/226 |
| 2005/0240928 A1* | 10/2005 | Brown et al. | 718/100 |
| 2008/0216082 A1* | 9/2008 | Eilam et al. | 718/104 |

* cited by examiner

*Primary Examiner* — John B. Walsh

(57) ABSTRACT

Disclosed are methods and systems for intelligent resource pool management of heterogeneous datacenter resources. In one embodiment, intelligent resource pool management is utilized to assist in application provisioning performed based upon a blueprint and deployment model defining requirements of the provisioned application. In other embodiments, intelligent resource pool managers are configured to work in concert with other intelligent resource pool managers and/or a centralized provisioning engine. Resource pools may also be configured in a hierarchical manner whereby higher level resource pools may automatically draw resources from lower level resource pools as directed by one or more intelligent resource pool managers.

25 Claims, 5 Drawing Sheets

INTELLIGENT AND ELASTIC RESOURCE POOLS FOR HETEROGENEOUS DATACENTER ENVIRONMENTS

CROSS REFERENCE TO RELATED APPLICATIONS

This disclosure claims priority to Provisional U.S. Patent Application Ser. No. 61/291,106 filed 30 Dec. 2009 by Suhas A. Kelkar et al. entitled "Intelligent and Elastic Resource Pools for Heterogeneous Datacenter Environments" and which is hereby incorporated by reference in its entirety. This disclosure is also related to U.S. patent application Ser. No. 12/847,949 filed 30 Jul. 2010 by Suhas A. Kelkar et al. entitled "Application Blueprint and Deployment Model for Dynamic Business Service Management (BSM)" and which is hereby incorporated by reference in its entirety. This disclosure is also related to U.S. patent application Ser. No. 12/872,921 filed 31 Aug. 2010 by Suhas A. Kelkar et al. entitled "Automating Application Provisioning for Heterogeneous Datacenter Environments" and which is hereby incorporated by reference in its entirety.

BACKGROUND

Datacenters are increasingly being required to rapidly adapt to changes in customer requirements. It is no longer sufficient to provide a fixed, unchanging collection of servers and application software programs. Datacenters could benefit from being able to completely reconfigure servers from heterogeneous physical and logical resources in a short period of time in order to keep up with the constantly varying demands of content and application service providers. The need for a dynamic operating environment has resulted in the development of deployable application servers. Application servers may be deployed using a number of solutions, including script based installations of operating systems and applications remotely launched from a deployment management station, as well as virtual machine (VM) image based installations onto a system running a hypervisor, just to name two examples. In computing, a hypervisor, also called a virtual machine monitor (VMM), is a piece of software/hardware performing a platform-virtualization function that allows multiple instances of an operating system to run on a host computer concurrently (e.g., VMs).

Script-based installations of an application server are typically slow. It may take a significant amount of time to run the script-based installation (up to several hours) and thus may not be adequate to rapidly respond to changes in demand. In contrast, virtual machine images can be deployed more quickly than script-based solutions. However, prior art images of virtual machines must be preconfigured as if they were a homogeneous replica of an application server and thus represent a static resource that cannot be quickly created "on-demand" in response to unexpected requirement and demand changes. Additionally, prior art solutions have relied on centrally managed homogeneous pools of resources to satisfy provisioning requests.

Both script-based and deployment of pre-configured virtual machine images can also include manual processes that may be susceptible to human error. To complicate matters further, existing solutions are not designed to handle a heterogeneous operating environment, wherein different application products, different operating systems, different real (i.e., physical servers), and virtual computer systems may all need to co-exist and work together to optimally satisfy the needs of a datacenter.

The subject matter of the present disclosure is directed to overcoming, or at least reducing the effects of, one or more of the problems set forth above.

SUMMARY

Disclosed are methods, systems and computer readable media to provide intelligent resource pool management for a hierarchy of heterogeneous resource pools. At the lowest level of granularity, a resource pool may contain homogeneous resources. However, providing a hierarchical abstraction layer and intelligent resource pool managers for at least some of the different levels of abstraction could allow for improved decentralized management of resource pools. In one embodiment, intelligent resource pools (IRPs) are configured with an intelligent resource pool manager (IRPM). Each IRPM can be configured with a certain level of autonomy and still cooperatively function in concert with other IRPMs and/or a centralized provisioning engine. Some or all of the IRPMs can utilize the hierarchical abstraction information to automatically draw from lower level resource pools when needed or to automatically replenish higher level resource pools. In one embodiment, an Application Definition blueprint and Deployment model as described in U.S. patent application Ser. No. 12/847,949 filed 30 Jul. 2010 by Suhas A. Kelkar et al. entitled "Application Blueprint and Deployment Model for Dynamic Business Service Management (BSM)" can be utilized by the IRPMs.

DETAILED DESCRIPTION

Figure 1A:
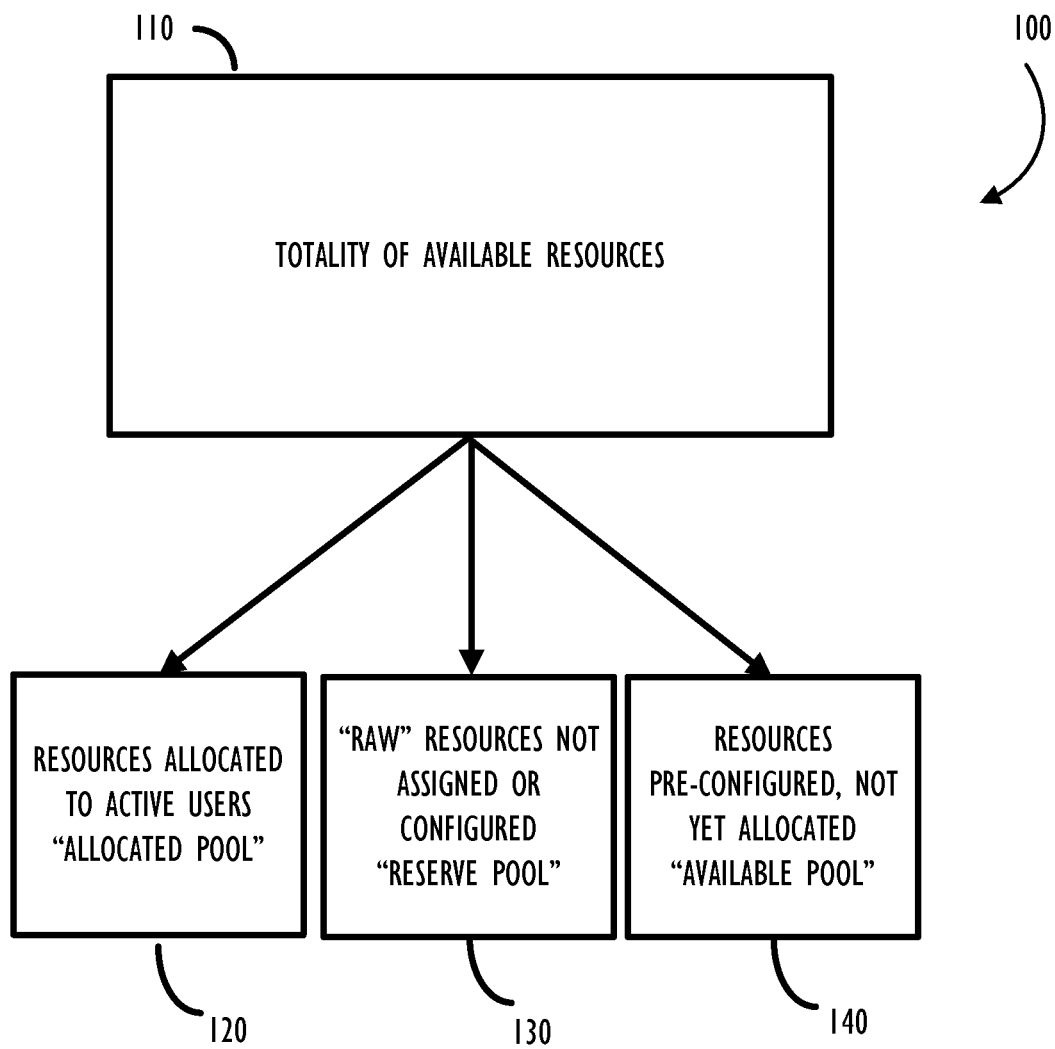
FIGS. 1A-B illustrate, in block diagram form, an example division of computer resources in a hierarchical manner according to one disclosed embodiment.

The present disclosure describes intelligent elastic resource pools implemented using computer hardware and/or software which extend the concept of dynamic datacenter resources to heterogeneous pools of resources that include differing types of physical, virtual and cloud resources. In at least some embodiments, one or more selection algorithms may be used to provide a best fit resource candidate in response to incoming resource requests. Thus, various levels of service can be defined for different pools of resources, and resources may be drawn from each pool depending upon the availability of the resource. For example, if a pool of high performance computers has been exhausted, and a request comes in that requires a level of service that only such computers can provide (e.g., a "platinum" level of service), the request may still be serviced by providing a less-than-requested level of service (e.g., "gold") if the requesting client has agreed to such downgraded service at an appropriately discounted rate. Similar requests based upon cost criteria (e.g., lowest cost) may also be implemented.

Resource Pools (RPs) can be made into an Intelligent Resource Pool (IRP) by implementing an Intelligent Resource Pool Manager (IRPM). An IRPM can be responsible for a particular kind of resource or for a particular logical grouping of resources. Additionally, RPs may be structured hierarchically and be "chained" with other RPs. Thus, for example, a virtual machine pool with a mix of virtual machine images from various vendors may load such virtual machines (with an appropriate hypervisor) on computer system partitions drawn from a second, similarly created and maintained partition pool. Such chaining also enables an IRP to automatically replenish its pool as resources are allocated so as to maintain a minimum level of resources within the managed pool. In at least some embodiments, such replenishment may be done in anticipation of future demands until all lower-level resources are exhausted.

The use of chained heterogeneous IRPs also creates a level of abstraction that may alleviate the need to hard bind applications to underlying resources. Such an abstraction can provide for easier swapping of resources without adversely affecting the behavior of an application. For example, a generic "web server" application can be provided from a pool of such servers that can include both Apache web servers and Microsoft IIS servers for hosting web sites that are designed to be hosted on either type of server. Thus, the behavior of the web server application is not adversely affected by the web server application resource selected. Similarly, a pool of generic "servers" may be built from a collection of both physical and virtual servers, so long as the performance requirements of the hosted application are met.

Application provisioning refers to selecting one or more servers from a pool of available servers, either real or virtual, and preparing the selected servers for a requesting end-user. Preparing the selected servers includes, but may not be limited to, loading the server with the appropriate software (e.g., operating system, device drivers, middle ware, and applications), configuring network connections and optionally configuring upstream network resources, allocating shared storage and optionally configuring storage adapters and arrays, appropriately customizing and configuring the system, and starting the server with its newly-loaded software. Customizing and configuring may include configuring boot images for the servers by changing their stored parameters to affect how they will be instantiated. For example, patches could be applied to the boot image, an audit could be performed on the boot image, or addresses of the boot image (e.g., network address, gateway address) could be altered. After these setup tasks are performed, either prior to or after the step of instantiating the image, the provisioned server is ready for operation and addition to a datacenter network.

In some disclosed embodiments, a user-selectable application definition (ADF) or blueprint (BP) defines at least part of the structure of an application or an application server in terms of "tiers" and the relationships between tiers. Tiers can represent classes of application servers that are available for selection by a user of a computer system implementing the described embodiments. Examples of tiers that may be defined within a BP include, but are not limited to, a database tier and a web tier. Other applications and application tiers that may be included within a BP will become apparent to those of ordinary skill in the art, and all such applications and application tiers are contemplated by the present disclosure.

A BP may also include one or more deployment options associated with each tier, such as different product choices and combinations. For example, a user may select a BP that includes either JBoss® 4.0 or Tomcat as the product that is to be installed to implement a web tier and either Oracle 10g® or MySQL 5 for a database tier. (JBOSS is a registered trademark of Red Hat, Inc. ORACLE 10G is a registered trademark of Oracle International Corporation. MySQL is a trademark of MySQL AB Company. Tomcat is a trademark of the Apache Software Foundation). Any number of different tiers may be defined, reflecting the broad variety of applications that may be hosted on a deployed server. A BP may also define environment and other variables needed to successfully provision a server. However, because a BP does not specify physical resources, virtual resources or content needed for successful application server provisioning, the BP is therefore portable and can be reused across a wide variety of different resources available within a heterogeneous datacenter.

In some embodiments, a user-selectable deployment intent definition (DDF) or deployment model (DM) may also be defined and can be used to at least partially augment a BP or ADF. The DM conforms to a BP but is a lower level document that focuses on the intent of the deployment (e.g., production, testing, demonstration and quality control uses). The DM can be used to associate product content with each tier defined within the blueprint. Such content may include installation programs, artifacts and configuration scripts that are used to configure the application server and its environment to conform to a user's requirements. The deployment model may further associate resource requirements with the products for each tier such as, minimum required computing, storage and network resource capacities. The deployment model may also include one or more rules that further govern the provisioning and deployment of application server instances (e.g., a maximum number of instances based upon the level of service required/purchased by the user, or a licensing limitation).

In a preferred embodiment IRPs can be configured with an IRPM to utilize BPs and DMs. For more information about application blueprints and deployment models please refer to U.S. patent application Ser. No. 12/847,949 filed 30 Jul. 2010 by Suhas A. Kelkar et al. entitled "Application Blueprint and Deployment Model for Dynamic Business Service Management (BSM)" which is hereby incorporated by reference in its entirety.

As stated above, the present disclosure describes systems and methods for IRPs to assist in server provisioning of heterogeneous datacenter resources and may be extended to include the higher level steps required to facilitate application provisioning. Referring now to FIG. 1A, block diagram 100 illustrates one possible division of a totality of available resources (block 110) divided into three (3) pools (i.e., logical groupings). An Allocated Pool 120 represents resources that have been provisioned and are currently associated with an executing application or a persistently allocated application (i.e., one that is not provisioned repeatedly when needed). Reserve Pool 130 represents "raw" resources that have not yet been configured. When "raw" resources are configured they may be added to either the Available Pool 140 or, if necessary, immediately used to satisfy an allocation request and thus be added to the Allocated Pool 120. Available Pool 140 represents compute, network, and storage, etc. Resources in Available Pool 140 can be resources that have been pre-configured in anticipation of some expected future need or to satisfy an immediate need.

Figure 1B:
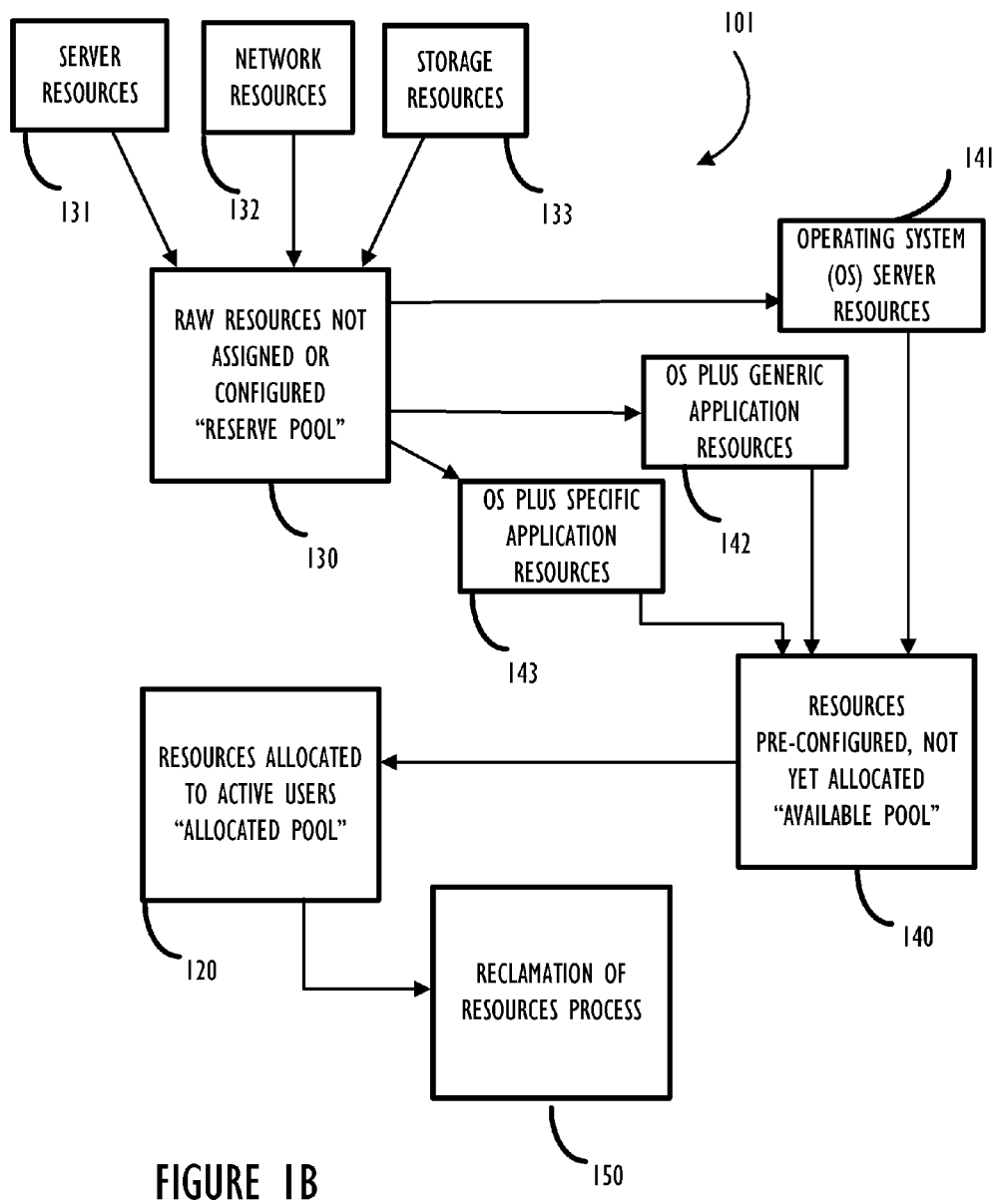

Referring now to FIG. 1B, block diagram 101 illustrates an example division of Reserve Pool 130 and Available Pool 140. In this example, Reserve Pool 130 can be configured with an IRPM (not shown) to be made intelligent and automatically draw from Server Resources 131, Network Resources 132 and Storage Resources 133. Similarly, Available Pool 140 can be configured with an IRPM (not shown)

and automatically draw from server resources configured with only an Operating System (OS) (block 141), OS plus generic (e.g., default configuration) application resources 142, or OS plus specific (e.g., pre-configured with special configuration parameters) application resources 143. Additionally, the IRPM of Reserve Pool 130 may be configured to coordinate with the IRPM of Available Pool 140 or to coordinate with a centralized Provisioning Engine (270 of FIG. 2 described below).

Server Resources 131 can include a plurality of lower level resource pools (not shown). Some non-limiting examples include:

Device Resource Pools: These pools can contain raw devices that are identified by Media Access Control (MAC) addresses, which can either be imaged or network booted for provisioning.

Managed Server Resource Pools: These pools can contain managed servers that are either dormant or running. If dormant, the server can be revived for utilization. If running with available capacity, the server can possibly co-host a new request with other applications and thus eliminate an unnecessary instantiation of another server. This type of pool can contain both virtual and physical servers.

Virtual Managed Server Resource Pools: Virtual server resource pools can contain managed virtual machines where the hypervisor is also managed. This can allow taking actions such as changing the configuration of a VM, assigning a VM to a VMware® resource pool, or spinning up the VM. (VMware is a registered trademark of VMware, Inc.).

Hypervisor Resource Pool: Hypervisor resource pools contain hypervisors which are a source of VMs. New VMs can be created based on a resource request, or existing VMs can be cloned or reconfigured. In the case of VMware, the hypervisor resource pool can also be attached to a VMware resource pool in Virtual Center. These resource pools can be further classified into Solaris zones resource pools and mainframe logical partition (LPAR) resource pools. (Solaris is a registered trademark of Sun Microsystems, Inc.).

Frame Resource Pools: Frame resource pools can contain frames (e.g., Cisco®UCS frames) and can specify a "server profile template." (Cisco is a registered trademark of Cisco Systems Inc.). Server profile templates and frame resources can be used to manufacture a blade server to a request's specifications.

Network Resources 132 can include a plurality of lower level resource pools (not shown). Some non-limiting examples include:

Internet Protocol (IP) Address Resource Pools: These pools can contain IP addresses that can be allocated to servers that require fixed IP addresses. Pool resources can be individual IPs or subnets.

Virtual Local Area Network (VLAN) Resource Pools: These pools can contain VLANs that can be assigned to a group of resource requests. Thus an application server and a database server being used for the same application request can reside on the same VLAN.

Load Balanced IP Pools: These pools can have sets of IPs which are part of a load-balanced configuration. IPs from this pool can be assigned to a set of web servers, for example, to provide load balancing.

Network Address Translation (NAT) Address Pools: Connections can have their source address translated to an address from the pool using NAT rules. NAT address pools can provide an IP configuration that allows specific NATed addresses.

Network Container Resource Pools: These pools can contain definitions of network containers which define a set of network resources that provide isolation in a co-hosted environment. The network container can form an envelope around the compute and storage resources for isolation and security.

Network Zone Resource Pools: network zones can provide a more granular level of isolation and exist with network containers. Pools of zones are used for application isolation.

Storage Resources 133 can include a plurality of lower level resource pools (not shown). Some non-limiting examples include:

World Wide Port Name (WWPN) Resource Pools: These pools can represent WWPNs that can be assigned to storage adaptors of servers that are being built so that these servers can be later configured for storage volumes.

WWPN+WWPN Resource Pools: These pools can represent WWPN end points which point to allocated storage. This can allow for preconfigured storage to be allocated on request.

WWPN+WWPN Boot Pools: These pools can represent preconfigured bootable storage for servers that will boot from a storage area network (SAN). This pool is managed separately because bootable SAN volume resources are typically managed differently than non-bootable resources.

Network File System (NFS) and Windows® Share Resource Pools: NFS and Windows Shares that are available on the network as storage volumes or common storage across applications can belong to these types of storage pools. (Windows is a registered trademark of Microsoft Corporation).

Virtual Machine Disk (VMDK) Resource Pools: VMware VMDK files that can be associated with a VM to provide additional storage or boot/image configuration can be part of this type of resource pool. A new server personality can be created by virtue of associating such a resource to a VM or the VM can be provided with extra storage, which can appear as an extra drive to the guest OS.

As discussed above, block 140 represents resources that have been at least partially configured. Those of ordinary skill in the art, given the benefit of this disclosure, will recognize that optimizing the granularity of pools and specificity of pre-configuration of resources in pools may vary from one enterprise environment to the next based on particulars of each enterprise environment. Furthermore, after resources have been made available they will typically next be used to satisfy an application provisioning request. Allocated Resource Pool 120 illustrates resources actively in use or persistently allocated. Allocated Resource Pool 120 can be configured with an IRPM (not shown) to communicate with other IRPMs or other processes such as a reclamation of resources process 150. Reclamation of resources process 150 may be invoked after a provisioned application on previously allocated resources has completed its task or may be invoked based on timers or threshold requirements and actually reclaim resources from Available Pool 140. Additionally, reclamation of resources process 150 may alternatively be initiated by the IRPM of Reserve Pool 130 when that IRPM detects a potential inability to satisfy a priority (discussed further below) request for resources.

Figure 2:
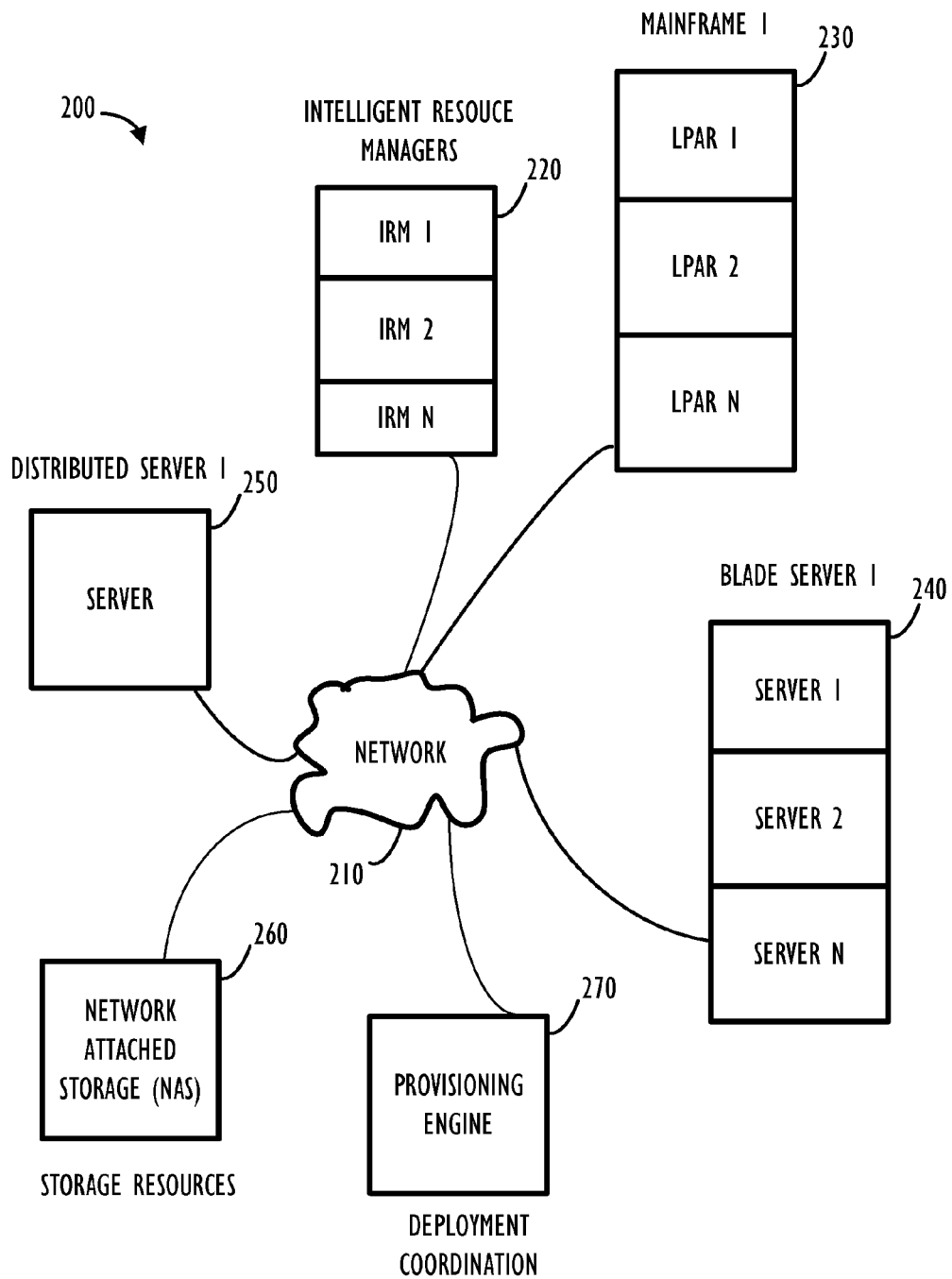
FIG. 2 illustrates, in block diagram form, an example system of decentralized intelligent resource pool managers configured to manage heterogeneous computer resources communicatively coupled via a network according to one disclosed embodiment.

Referring now to FIG. 2, an overview of a provisioning environment (system 200) is described as an example of one possible disclosed embodiment. In accordance with this disclosure, at least some embodiments are implemented in hardware, software or a combination of hardware and software by one or more computer systems communicatively coupled to each other across a network 210 or bus (not shown). At least one computer system can perform functions that include an IRPM 220. Provisioning engine 270 can automate the provisioning and deployment process and provide an abstraction layer isolating a system user from some details associated with the process. An example of one possible control flow, which could be implemented in system 200, is shown in process 300 of FIG. 3 described further below.

In the example embodiment of system 200, a user may request an application instance by identifying a blueprint and a desired deployment model. The identification can take place on a work station computer attached to network 210 and providing a suitable user interface. The user's blueprint and deployment model request can then be forwarded across network 210 for processing by provisioning engine 270. Provisioning engine 270 can derive the requested DM (DDF) from the BP (ADF) by augmenting the BP with information from the DM. Next, provisioning engine 270 alone or with the help of another network attached processor executing an IRPM 220 can determine which resources, from appropriate resource pools, are needed to meet the request. Provisioning engine 270 can then interact with one or more IRPMs 2,20 to select the required storage resource(s) from storage resource pool 260 and/or compute resources from compute resource pools 230-250. IRPMs 220 can access managed resources and group the resources as necessary to meet a request (e.g., server 250, network 210 and storage resources 260). Server resources may be real or virtual and may include, for example, individual computer systems (e.g., 250), logical partitions within a mainframe computer (230) and computer systems running hypervisors such as blade server 240. Storage 260 and network 210 resources may also be either real or virtual.

After required resources are selected, provisioning engine 270 can interact with IRPMs 220 to provision selected resources as specified by the BP and DM. Products or product combinations used to provision the resources may be drawn from one or more homogeneous or heterogeneous pools as determined by one or more IRPMs working together with provisioning engine 270 (e.g., an image server storing preconfigured images). For example, a pool of virtual machine images configured as generic Oracle® database servers running under Linux® may be provided by the provisioning product for installation on selected resources. (ORACLE is a registered trademark of Oracle Corporation; LINUX is a registered trademark of Linus Torvalds.). Such an installation may be done by copying the virtual machine image to the selected storage resource and configuring a hypervisor on the selected server resource to activate the copied virtual machine image. Once activated and booted, the virtual machine and database server application may be further configured to conform to the requested deployment model (e.g., using one or more installation scripts specified by the deployment model).

In at least some embodiments, pools are managed independently via a dedicated IRPM such as IRPM 1 (220). Each of IRPMs 1 through N (220) can autonomously manage a subset of resources to decentralize the overall management process of datacenter resources. Additionally each IRPM 220 can automatically draw upon lower level resource pools as necessary when the number of available resources in a given pool drops below a threshold value. For example, if the pool of Linux virtual machine images becomes depleted, the IRPM managing the number of Linux virtual machines can automatically draw upon another pool of raw resources to configure or instantiate additional Linux virtual machines. Because the pool replenishing can be performed proactively before an anticipated pool combination is needed, subsequent user requests may be provisioned on-demand with little or no delay. As shown in system 200 each of IRPMs 1-N (220) are remote (i.e., across network 210) from the actual resources they are managing. However, some or all IRPMs may also be configured to execute locally with the resources for which the particular IRPM is responsible. Distribution of IRPMs (220) across managed resources is typically a design decision based on particulars of the resource infrastructure.

Figure 3:
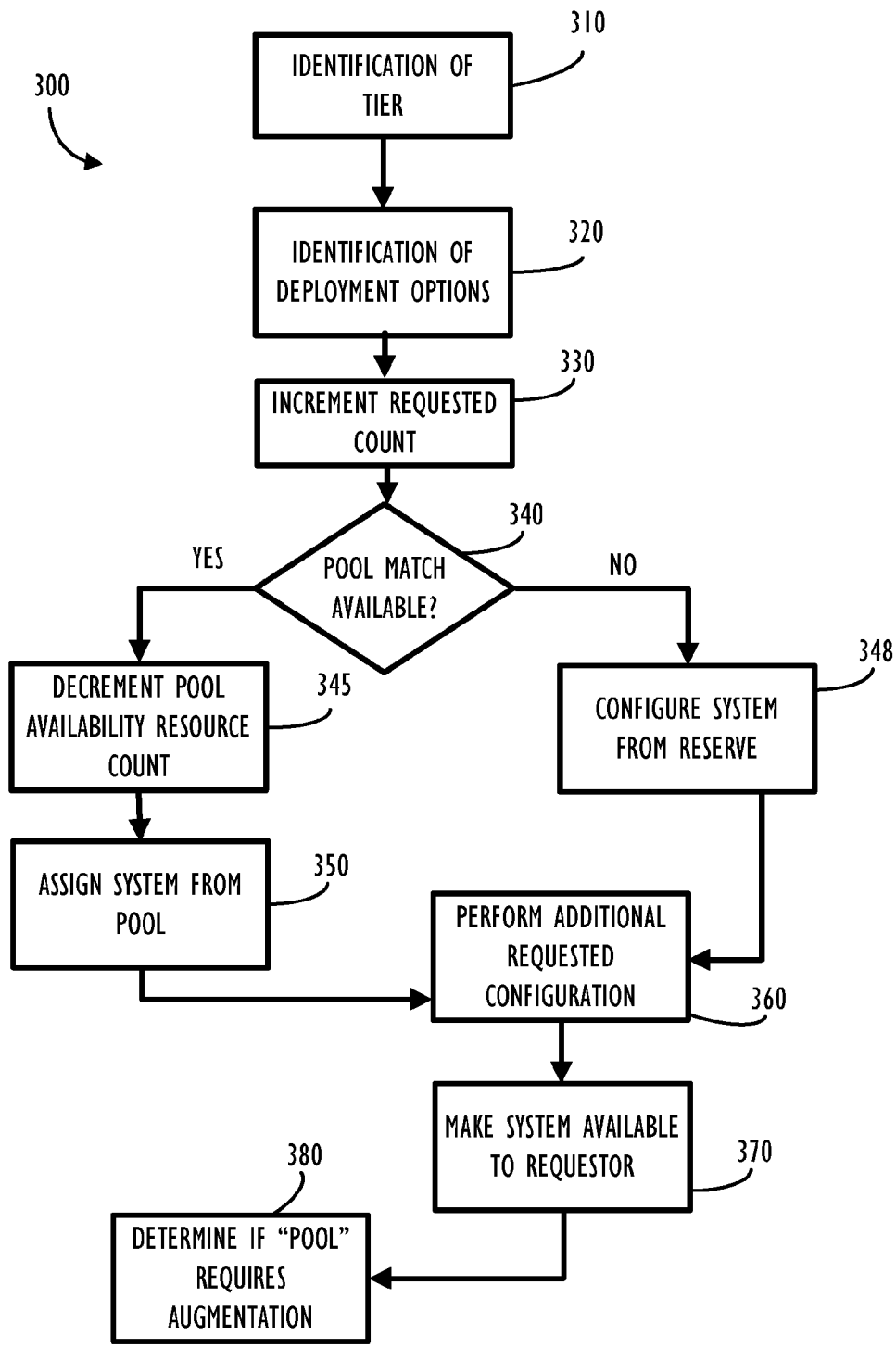
FIG. 3 illustrates, in flowchart form, a process flow for one embodiment of application provisioning of computer system resources.

Referring now to FIG. 3, process 300 illustrates one possible overview of application provisioning. It will be apparent to those of ordinary skill in the art that acts in accordance with process 300 may be distributed across one or more IRPMs. Beginning at block 310, a Tier is identified based on the provisioning request. Next, at block 320 the deployment options are identified to satisfy the provisioning request. For example, a request may require Linux and Oracle or may also function properly on Windows and MySQL. Counts of requested resources can be maintained (block 330) for capacity planning purposes or for proactive configuring of resource pools as described above. The deployment options can also be taken into account when performing a search for matching resources from the resource pool (decision 340). If no matching resources are currently available (the NO prong of 340) a system(s) may be configured from reserve pools at block 348. If matching resources are available (the YES prong of 340) then pool availability counters can be decremented at block 345 and resources can be assigned to satisfy the request at block 350. In either case, after the system(s) are configured processing flow continues to block 360 where additional required configurations can be performed. At block 370, after all configuration steps are complete the system(s) is made available to the requestor. Finally, block 380 illustrates that a determination can be made to determine if any of the pools need to be replenished from the reserve in anticipation of a future request. Note that block 380 may be performed as shown, periodically or at any time in process 300 and, in one embodiment, is performed by each IRPM dynamically throughout process 300. Also note that replenishment may comprise replacing resources with different resources capable of performing a similar function. For example, a windows server running Oracle may be configured to replace a Linux server running Oracle when no more Linux instances or licenses for Oracle on Linux are available. This can be thought of as replenishing with substantially similar or resources commensurate with resources utilized to support a previous provisioning request.

Figure 4:
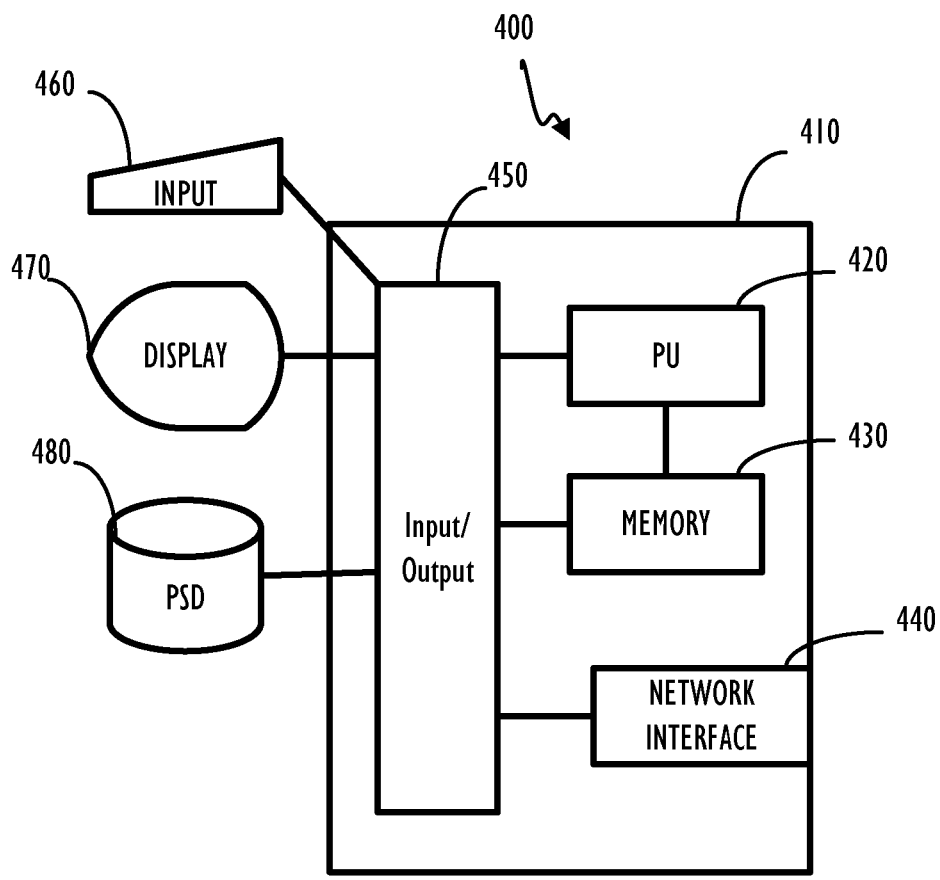
FIG. 4 illustrates, in block diagram form, an example computing device comprising a program control device.

Referring now to FIG. 4, exemplary computing device 400 is shown. One or more exemplary computing devices 400 may be included in a mainframe computer (not shown). Exemplary computing device 400 comprises a programmable control device 410 which may be optionally connected to input device 460 (e.g., keyboard, mouse, touch screen, etc.), display 470 or program storage device (PSD) 480 (sometimes referred to as a direct access storage device DASD, disk or persistent memory). Also, included with program control device 410 is network interface 440 for communication via a network with other computing and corporate infrastructure devices (not shown). Note network interface 440 may be included within programmable control device 410 or be external to programmable control device 410. In either case, programmable control device 410 will be communicatively coupled to network interface 440. Also note, program storage device 480 represents any form of non-volatile storage including, but not limited to, all forms of optical and magnetic storage elements including solid-state storage.

Program control device 410 may be included in a computing device and be programmed to perform methods in accordance with this disclosure (e.g., those illustrated in FIG. 3). Program control device 410 may itself comprise processor unit (PU) 420, input-output (I/O) interface 450 and memory 430. Processing unit 420 may include any programmable controller device including, for example, processors of an IBM mainframe (such as a quad-core z10 mainframe microprocessor). Alternatively, in non-mainframe systems examples of processing unit 420 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 430 may include one or more memory modules and comprise random access memory (RAM), read only memory (ROM), programmable read only memory (PROM), programmable read-write memory, and solid state memory. One of ordinary skill in the art will also recognize that PU 420 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 3 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of managing hierarchically structured resource pools to support application provisioning requests, the method comprising:
   receiving a first request at a provisioning engine from a higher level resource pool manager, executing on a program control device, the first request identifying resources to support an application provisioning request;
   sending a second request to one or more locally managed resource pools indicating desired resources commensurate with the first request, the one or more locally managed resource pools being lower in a hierarchy than the provisioning engine;
   receiving one or more responses associated with the second request from the one or more locally managed resource pools, the response identifying potential resources indicating resources commensurate with replenishing the one or more locally managed resource pools;
   processing at least a portion of the one or more responses; and
   allocating from the processed one or more responses a set of resources to support the application provisioning request.

2. The method of claim 1 wherein locally managed resource pools comprise resource pools configured with an intelligent resource pool manager.

3. The method of claim 1 further comprising sending a confirmation message for each received response wherein the confirmation message indicates allocated resources selected from the identified potential resources.

4. The method of claim 1 wherein the identified potential resources comprise resources selected from the group consisting of server resources, network resources, and storage resources.

5. The method of claim 4 wherein server resources comprise resources selected from the group consisting of device resources, managed server resources, virtual managed server resources, hypervisor resources, and frame resources.

6. The method of claim 4 wherein network resources comprise resources selected from the group consisting of internet protocol (IP) address resources, virtual local area network resources, load balanced IP resources, network address translation address resources, network container resources, and network zone resources.

7. The method of claim 4 wherein storage resources comprise resources selected from the group consisting of world wide port name (WWPN) resources, WWPN+WWPN boot resources, shared file system resources, and virtual machine disk resources.

8. The method of claim 1 wherein hierarchically structured resource pools comprise resource pools complying with an inheritance model.

9. A non-transitory computer readable medium comprising computer readable instructions stored thereon to cause a processing device to perform the method of claim 1.

10. A computer network comprising:
a plurality of processing units communicatively coupled to a computer network; a first processing unit configured to perform at least a portion of the method of claim 1 wherein the entire method of claim 1 is performed collectively by the plurality of processing units.

11. A computer system comprising one or more programmable control devices communicatively coupled to each other and to a computer network, wherein the one or more programmable control devices are programmed to perform the method of claim 1.

12. A method of managing hierarchically structured resource pools, the method comprising:
receiving, at a local resource pool manager executing on a program control device, a first request from a higher level resource pool manager for resources to be obtained from a locally managed resource pool;
sending a second request to a lower level resource pool manager, the second request indicating resources commensurate with replenishing the locally managed resource pool; and
sending a response to the higher level resource pool with an indication of resources to support the first request.

13. The method of claim 12 wherein the higher level resource pool manager comprises a provisioning engine deployment coordinator.

14. The method of claim 12 wherein the higher level resource pool manager comprises a resource pool manager at a lower level than a provisioning engine deployment coordinator.

15. The method of claim 12 wherein the local resource pool manager communicates directly with a provisioning engine deployment coordinator.

16. The method of claim 12 wherein the first or second request indicate resources selected from the group consisting of server resources, network resources, and storage resources.

17. The method of claim 16 wherein the server resources comprise resources selected from the group consisting of device resources, managed server resources, virtual managed server resources, hypervisor resources, and frame resources.

18. The method of claim 16 wherein network resources comprise resources selected from the group consisting of internet protocol (IP) address resources, virtual local area network resources, load balanced IP resources, network address translation address resources, network container resources, and network zone resources.

19. The method of claim 16 wherein storage resources comprise resources selected from the group consisting of world wide port name (WWPN) resources, WWPN+WWPN boot resources, shared file system resources, and virtual machine disk resources.

20. The method of claim 12 wherein hierarchically structured resource pools comprise resource pools complying with an inheritance model.

21. A non-transitory computer readable medium comprising computer readable instructions stored thereon to cause a processing device to perform the method of claim 12.

22. A computer network comprising:
a plurality of processing units communicatively coupled to a computer network;
a first processing unit configured to perform at least a portion of the method of claim 12 wherein the entire method of claim 12 is performed collectively by the plurality of processing units.

23. A computer system comprising one or more programmable control devices communicatively coupled to each other and to a computer network, wherein the one or more programmable control devices are programmed to perform the method of claim 12.

24. The method of claim 12 wherein replenishing the locally managed resource pool includes adding resources to the locally managed resource pool without allocating the resources to an instance of an application.

25. The method of claim 1 wherein the first request is a request to allocate resources for a new application instance.

* * * * *